United States Patent
Ting et al.

(10) Patent No.: US 9,251,354 B2
(45) Date of Patent: Feb. 2, 2016

(54) SECURE ACCESS SUPERSESSION ON SHARED WORKSTATIONS

(71) Applicants: David M. T. Ting, Sudbury, MA (US); Pieter-Jan Boone, Bedford, MA (US); Timothy Ford, Methuen, MA (US)

(72) Inventors: David M. T. Ting, Sudbury, MA (US); Pieter-Jan Boone, Bedford, MA (US); Timothy Ford, Methuen, MA (US)

(73) Assignee: Imprivata, Inc., Lexington, MA (US)

( * ) Notice: Subject to any disclaimer, the term of this patent is extended or adjusted under 35 U.S.C. 154(b) by 37 days.

(21) Appl. No.: 14/054,270

(22) Filed: Oct. 15, 2013

(65) Prior Publication Data

US 2014/0109243 A1    Apr. 17, 2014

Related U.S. Application Data

(60) Provisional application No. 61/713,920, filed on Oct. 15, 2012.

(51) Int. Cl.
*G06F 21/00* (2013.01)
*G06F 21/60* (2013.01)
*G06F 21/31* (2013.01)

(52) U.S. Cl.
CPC ............... *G06F 21/60* (2013.01); *G06F 21/31* (2013.01)

(58) Field of Classification Search
None
See application file for complete search history.

(56) References Cited

U.S. PATENT DOCUMENTS

| 5,924,074 | A | 7/1999 | Evans |
| 5,960,085 | A * | 9/1999 | de la Huerga ......... A61J 1/1437 235/380 |
| 7,552,467 | B2 | 6/2009 | Lindsay |
| 7,805,377 | B2 | 9/2010 | Felsher |
| 1,002,241 | A1 | 1/2011 | Ge et al. |
| 1,028,887 | A1 | 11/2011 | Hinkamp |
| 8,156,566 | B2 * | 4/2012 | Lim .................... G06F 21/6218 713/167 |
| 2001/0049610 | A1 | 12/2001 | Hazumi |
| 2002/0038333 | A1 * | 3/2002 | Evans .................. G06F 9/4443 718/107 |
| 2003/0069919 | A1 * | 4/2003 | Takahashi et al. ........... 709/108 |
| 2003/0121972 | A1 | 7/2003 | Lee et al. |
| 2003/0182586 | A1 * | 9/2003 | Numano ....................... 713/202 |
| 2005/0062238 | A1 | 3/2005 | Broadfield et al. |
| 2006/0074983 | A1 | 4/2006 | Jones |

(Continued)

FOREIGN PATENT DOCUMENTS

| CN | 101984448 A | 3/2011 |
| CN | 102244671 A | 11/2011 |

(Continued)

OTHER PUBLICATIONS

Piliouras, Teresa; Tian, Xin; Desai, Dhaval; Patel, Avani; Shah, Dhara; Su, Yang; Yu, Pui Lam (Raymond); Sultana, Nadia. Impacts of Legislation on Electronic Health Records Systems and Security Implementation. 2012 IEEE Long Island Systems, Applications and Technology Conference. http://ieeexplore.ieee.org/stamp/stamp.jsp?tp=&arnumber=6223106.*

(Continued)

*Primary Examiner* — Jeremiah Avery
(74) *Attorney, Agent, or Firm* — Morgan, Lewis & Bockius LLP

(57) ABSTRACT

Transitions between users at shared workstations that permit access to private health information or other secure data may be handled, without incurring unnecessary delays due to shutdown of all applications used by the departing user, by selectively hiding applications with sensitive information on a shared desktop while allowing temporary system access for the interrupting user.

7 Claims, 2 Drawing Sheets

(56) References Cited

U.S. PATENT DOCUMENTS

| | | | |
|---|---|---|---|
| 2006/0242422 A1* | 10/2006 | Hong | G06F 21/6218 713/182 |
| 2007/0016958 A1* | 1/2007 | Bodepudi et al. | 726/27 |
| 2007/0174410 A1* | 7/2007 | Croft | G06F 3/1415 709/208 |
| 2007/0180509 A1* | 8/2007 | Swartz et al. | 726/9 |
| 2008/0027752 A1 | 1/2008 | Phan et al. | |
| 2008/0109895 A1* | 5/2008 | Janevski | G06F 21/35 726/19 |
| 2009/0144557 A1* | 6/2009 | Sutton | 713/189 |
| 2009/0150292 A1 | 6/2009 | Trinh et al. | |
| 2011/0125892 A1* | 5/2011 | Rajan et al. | 709/224 |
| 2012/0011565 A1 | 1/2012 | Garlie et al. | |
| 2012/0072237 A1 | 3/2012 | Campbell et al. | |
| 2012/0089518 A1 | 4/2012 | Blonchek | |
| 2012/0130741 A1 | 5/2012 | Sparandara et al. | |
| 2012/0253851 A1 | 10/2012 | Phillips et al. | |
| 2012/0260333 A1* | 10/2012 | Uchikawa | 726/17 |

FOREIGN PATENT DOCUMENTS

| | | |
|---|---|---|
| JP | 2011233110 A | 11/2011 |
| KR | 100945819 B1 | 3/2010 |
| KR | 20120010747 A | 2/2012 |
| KR | 101156467 B1 | 6/2012 |
| TW | 201218010 A | 5/2012 |
| WO | WO-2010147077 A1 | 12/2010 |
| WO | WO-2011028261 A2 | 3/2011 |
| WO | WO-2012086910 A1 | 6/2012 |
| WO | WO-2012129265 A1 | 9/2012 |

OTHER PUBLICATIONS

Daniel, David Marius; Monica, Borda. Multimodal Access Control Systems Which Combines Classical Access Control Methods With Biometric Methods. 2010 9th International Symposium on Electronics and Telecommunications. http://ieeexplore.ieee.org/stamp/stamp.jsp?tp=&arnumber=5679320.*

* cited by examiner

140
SECURE ACCESS SUPERSESSION ON SHARED WORKSTATIONS

CROSS-REFERENCE TO RELATED APPLICATION

The present invention claims priority to and the benefit of, and incorporates herein by reference in its entirety, U.S. Provisional Application No. 61/713,920, filed on Oct. 15, 2012.

TECHNICAL FIELD

The invention relates generally to systems and methods for permitting secure interruption of a workstation session by a new user.

BACKGROUND

As computer systems become ubiquitous in both the home and industry, the ability for any one individual to access applications and data has increased dramatically. Although such ease of access has streamlined many tasks such as paying bills, ordering supplies, and searching for information, the risk of providing the wrong data or functionality to the wrong person can be fatal to an organization. Instances of data breaches at many consumer-product companies and the need to comply with certain statutory measures (e.g., Health Insurance Portability and Accountability Act (HIPAA), Child Online Protection Act (COPA), Sarbanes-Oxley (SOX), etc.) have forced many companies and institutions to implement much stricter system access policies.

Healthcare regulations mandate that "protected health information" (PHI) be accessible only by a caregiver explicitly authorized to access the information. Computer systems used in the healthcare sector, therefore, require proper user authentication before granting access to and/or allowing alterations in PHI; this not only ensures patient privacy and safety, but also permits changes made to patient records to be audited later. User authentication and subsequent access to PHI (or other secure data) and/or to software applications utilizing such data is generally governed by well-known authentication sequences and access workflows. Challenges arise, however, in circumstances where multiple users share a workstation. In the event of a user transition, it may be necessary to prevent the new user from accessing or even viewing information utilized on-screen by the departing user.

One approach employed extensively in the healthcare sector, and which is derivative of the well-known desktop security model used with personal computers, involves security software that controls the workflow following a user switch to (1) prevent the new user from accessing the departing user's desktop, e.g., by shutting down all the applications launched by the departing user or otherwise disabling access, and (2) close the departing user's desktop and provide a new desktop personalized to the new user. Clearing and restarting the desktop introduces a significant delay due to the need for the operating system to release resources associated with one user before they are reallocated for the new user. These operations are generally tolerable between work shifts since initial log-in delays are common in most secure networks and occur only once. But the delays can be unduly disruptive in fast-paced environments, such as hospitals, where workers constantly move from one computer to another and control of a workstation must often shift on a frequent and unpredictable basis. For example, a treating physician may require immediate access to a patient's records, and will utilize the nearest workstation to obtain it; a long transition procedure inconveniences both the physician and the workstation user being "bumped"—particularly the latter if such interruptions occur often.

To reduce the delay associated with restarting a new desktop each time a transition occurs, hospitals use different strategies to isolate one user's applications from another. A common technique is to operate the workstation in a "kiosk mode" where a common desktop is shared by all users using a generic system account with limited access to system functionalities. Users in this kiosk mode log on via a "screensaver" application that, upon a user switch, locks the desktop and shuts down (or logs the departing user off) all applications before unlocking the generic desktop for the new user; the screen saver provides a log-on screen similar to that provided by the operating system. Eliminating the need to switch "ownership" of the desktop reduces system delays, and each new user starts with a pristine instance of the shared desktop (since all applications started by the previous user are terminated).

A second technique relies on running the user's session on a back-end server and delivering a "virtualized desktop" to the workstation using a terminal emulation program (such as CITRIX RECEIVER, VMWare VIEW or Microsoft RDP). Upon a user switch, the screen-saver program disconnects the terminal emulation program from one server session (blocking user access) and then reconnects the emulator to another user's session. Since a user's session is never terminated—it runs on the back-end server—this approach allows the user to roam from one device to another while maintaining the state of all applications she is running.

While both of these approaches reduce delay relative to full shut-down and restart operations, they still take time, and therefore are better suited to long-term transitions (e.g., between shifts) than to handling priority interruptions in which a computer being used by one user must be quickly (and briefly) relinquished to another user for a critical task. With either of the conventional approaches described above, the interrupted user, on giving up the computer, still needs to log off (possibly losing work with active applications) before allowing the interrupting user to log in. All of these operations take time and induce frustration in circumstances involving frequent, temporary workstation transfers.

SUMMARY

In embodiments described herein, to facilitate (usually brief) interruptions of one workstation user by another without incurring long delays, applications are secured not by shutting them down, but instead by "hiding" them on the desktop, both visually and functionally. The interrupting user is, thus, prevented from viewing the preempted user's application(s) as well as from providing input to or otherwise accessing the application(s). Once the interrupting user relinquishes control of the workstation to the first user, that user's applications are immediately "unhidden," allowing the first user to seamlessly resume work where she left off. This approach eliminates the risk for the first user of losing partially complete work, and enables the interrupting user to quickly log in and start a critical application. To further reduce the delay associated with transitioning access between users, security/privacy requirements are linked, in various embodiments, to specific applications (e.g., those permitting access to PHI or other sensitive data) rather than all desktop applications started by the first user, and only the sensitive applications are hidden.

For example, a nurse charting at a shared workstation may have open, on the desktop, applications including a database with access to electronic medical records (EMR), scheduling, and lab results; an email handler; and a browser. When his workflow is interrupted by a physician who requires immediate, temporary access to the workstation, the system need only hide the EMR and lab-results screens, as only these show patient data. The email, scheduling, and browser applications can be kept open as long as they do not contain PHI (in which case they can be hidden from view as well). While the physician logs in, viewing of the sensitive applications may be prevented, for example, by a screen saver that cover the desktop as the applications are being hidden. When the physician has successfully logged in, the screen saver may be removed and the critical application needed by the physician may automatically be started (and signed on with the physician's credentials). This workflow can be further streamlined when log-in access to workstations is controlled by authentication devices, such as, e.g., proximity card readers. (As used herein, the term "workstation" refers to any computing device with access, by wired or wireless means, to secure data; accordingly, a workstation may be any type of computer (e.g., a client or server in a client-server architecture), a tablet, a smart phone, etc.)

In one aspect, therefore, the invention pertains to a computer-implemented method for transitioning access to a shared desktop on a workstation, connected to a computer network, which is currently running, on the desktop, at least one application launched at the request of a first user. The method involves recognizing, by the workstation, a use request by a second (e.g., interrupting) user, and receiving, by the workstation via the network, an authorization from the server for the second user to access the desktop on the workstation. Further, the method includes causing the workstation to (i) hide without shutting down at least one application launched at the request of the first user, (ii) allow the second user to log on to the workstation to thereby access the shared desktop, (iii) launch at least one application requested by the second user, (iv) allow the second user to log off the workstation and, following log-off of the second user, (v) unhide the at least one application launched at the request of the first user. As used herein, "hiding" an application implies rendering the application functionally inaccessible and its content invisible to the current workstation user. "Unhiding" an application involves, accordingly, rendering the application accessible (e.g., allowing it to accept user input) and visible (e.g., by displaying it, or at least allowing display, on the desktop).

The use request may include an identifier associated with the second user, and the workstation may transmit the identifier to the server via the network. The use request may be issued by an authentication token. In some embodiments, the use request is issued by a mobile device that communicates initially with the server; the use request is then transmitted with the authorization from the server to the workstation. The workstation may be running a plurality of applications launched at the request of the first user, at least some of the running applications having access to secure data and are being hidden. Additionally, the workstation may run applications that do not have access to secure data (and/or that have data which the second user is authorized to view) and are, therefore, not hidden. The method may involve launching a screen saver before allowing the second user to log on. The method may further include requiring, by the workstation, a secondary form of authentication by the second user prior to allowing the second user to log on to the workstation. In some embodiments, following log-on of the second user, at least one application is launched automatically. The automatically launched application(s) may be specified by a database record of the second user accessed by the server, or may be determined at least in part based on activity logs of the second user. The method may also include preventing the second user from unhiding the application(s) launched at the request of the first user.

In another aspect, the invention is directed to a workstation configured for transitioning access to a shared desktop. The workstation includes a network interface; at least one user interface device; and a processor configured to (i) run at least one application launched at the request of the first user, (ii) recognize a signal indicative of a use request by a second user, (iii) receive via the network interface an authorization from the server for the second user to access the shared desktop on the workstation, (iv) hide without shutting down at least one of the running applications launched at the request of the first user, (v) allow the second user to log on to the workstation via the at least one user interface and the network interface to thereby access the shared desktop, (vi) launch at least one application requested by the second user, (vii) allow the second user to log off the workstation via the user interface device(s) and the network interface, and (viii) following log-off of the second user, unhide the at least one application launched at the request of the first user. The workstation may further include a reader for detecting and obtaining data from an authentication token issuing a use request, and the processor may be responsive to the reader to transmit, via the network interface, an identifier associated with the second user and included in the use request to the server. Alternatively, the use request may be issued by a mobile device that communicates initially with the server, the use request being transmitted with the authorization from the server to the workstation.

The processor may be configured to run a plurality of applications launched at the request of the first user (at least some of the applications having access to secure data), and selectively hide only the applications that have access to secure data or, among the applications with access to secure data, only those which the second user is not authorized to view. The processor may further be configured to launch a screen saver before allowing the second user to log on, to require a secondary form of authentication from the second user prior to allowing the second user to log on to the workstation, to automatically launch at least one application following log-on of the second user, and/or to prevent the second user from unhiding the application(s) launched at the request of the first user. Automatically launched application(s) may be specified by a database record of the second user accessed by the server, or determined at least in part based on activity logs of the second user.

BRIEF DESCRIPTION OF THE DRAWINGS

In the following, various embodiments of the invention are described in more detail in conjunction with the following drawings, in which.

DETAILED DESCRIPTION

Figure 1:
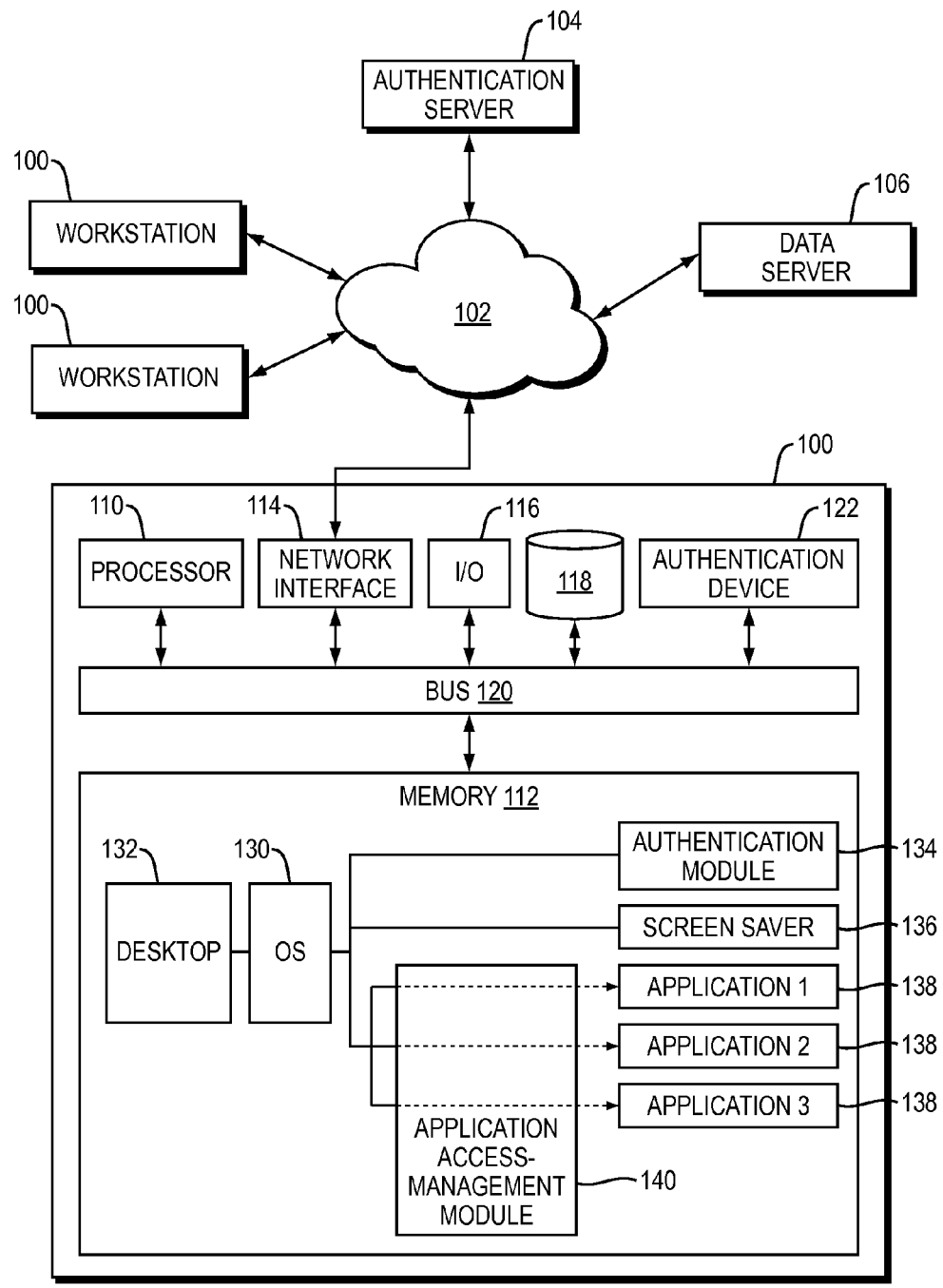
FIG. 1 is a block diagram of a network including a workstation and server in accordance with various embodiments.

Described herein are systems and methods for facilitating user transitions at shared workstations. Various embodiments relate, in particular, to network environments that include many workstations connected to a central server or group of servers, and which allow users to move between workstations; such network environments are routinely used, for instance, in hospital settings. FIG. 1 illustrates an exemplary embodiment, in which multiple workstations 100 are connected via a network 102 (e.g., an internal computer network or the Internet) to an authentication server 104 and a central data server 106. Each workstation 100 may be or include, e.g., a general-purpose computer with a processing unit 110, a system memory 112, a network interface 114 for wireless and/or wired network communications, user input/output devices 116, one or more non-volatile data storage devices 118, and a system bus 120 that couples these various system components. In addition, a user-authentication device 122, such as a proximity card reader, fingerprint biometric reader, or near-field communication (NFC) device, may be connected to the workstation computer. The memory 112 includes computer-executable instructions, which may be organized into multiple program modules, including, for instance, an operating system 130 (e.g., MICROSOFT WINDOWS) and associated desktop graphical user interface (GUI) 132 (hereinafter simply referred to as the "desktop"), as well as higher-level software applications such as an authentication module 134, a screensaver 136, one or more end-user applications 138 (such as, e.g., an email program, browser, office and database software, or clinical or other industry-specific applications), and an application-access-management module 140.

The desktop 132 is shared between all users of the workstation 100, and may be accessed under a generic system account (e.g., requiring log-in credentials shared by all users, or not requiring log-in credentials at all). For example, upon start-up of the workstation 100, the desktop 132 may be launched automatically. Via the desktop 132, the user may start any of the end-user applications 138, some of which may, in turn, establish communication with the central data server 106. Some applications, such as a web browser, may be accessible without requiring further credentials, whereas others, such as email programs or applications with access to PHI or other sensitive information, may require the user to log in under a personal user account. In some embodiments, the user is required to log in separately to each such application. In the preferred "single sign-on" system, however, the user needs to provide his login credentials only once, and then he is automatically logged in under his personal account to any application he starts. Either way, user authentication may be handled by the authentication module 134, which may compare authentication credentials against a database (or multiple databases) of authorized users stored on the authentication server 104 (or send the credentials to the authentication server 104 for comparison against the database thereat) to identify the user. Centralizing authentication in this manner allows the user to log on to any workstation within the network with the same credentials.

User authentication may be accomplished in two steps: detection of an authentication token (such as a facility access card) by the authentication device 122, followed by entry of conventional login information (such as username and password) or another secondary form of authentication. As used herein, the term "authentication token" means any card, device or other physical item (whether animate, such as a finger, or inanimate) having data (including, e.g., a fingerprint) embedded thereon and/or readable therefrom by contact or contactless means, e.g., by a reader that broadcasts RF and measures loading by the token or which receives RF transmitted by the token. For example, as described in copending U.S. Ser. No. 13/644,143, filed on Oct. 3, 2012 and entitled Secure Authentication Using Mobile Device (the entire disclosure of which is hereby incorporated by reference), the user may present a mobile device, e.g., an NFC-capable smart phone or tablet that communicates directly with the workstation or a reader. Alternatively, the mobile device may read an identifying tag on the workstation and transmit the read identifier (along with an identifier for the mobile device itself) to an authentication server via wireless cell phone communication and/or Wi-Fi LANs. In either case, the mobile devices serves as an "authentication token."

When the authentication device 122 of a workstation 100 detects an authentication token, the authentication module 134 checks with the authentication server 104 whether the token belongs to an authorized user. If so, the authentication module 134 may request a second form of authentication—typically conventional login credentials such as, e.g., username and password, but, alternatively, a second authentication token (e.g., a fingerprint if the first token was different); the second authentication credentials may likewise be sent to the authentication server 104, or compared against stored credentials already received from the server 104 in response to submission of the first token. A login screen for entry of user credentials may be integrated into the screensaver 136, which may, upon detection of a new user's presence (via detection of her authentication token), automatically start and cover the workstation screen to hide any potentially sensitive information thereon. The screensaver 136 may also launch following a specified period of inactivity at the workstation 100.

The authentication server 104 may store in its database(s) of authorized users, in addition to the users' authentication credentials (such as username and password, fingerprint templates, etc.), privilege information (such as a list of applications the user, or a class of user to which he belongs, is permitted to access) and/or user profiles/preferences and/or state information (such as lists of applications the user frequently accesses, desktop configuration parameters, etc.). User profiles/preferences and/or state information may allow personalizing the user's desktop appearance, upon log-in, to the user or a group of users (e.g., users sharing the same privilege level). For example, applications usually accessed by the user or group of users may be displayed as icons on the desktop whereas other applications may be accessible only via the task bar. Personalization may be achieved with a script that is loaded, or supplied with parameter values, from the authentication server 104 and runs "on top of" the desktop 134—the underlying desktop instance is still the same. This is different from starting a new desktop instance for each user, which would entail some of the delays upon a user transition that are frequently encountered in conventional emulated-desktop systems and which the instant invention is designed to avoid.

When a user is logged onto a workstation 100 and a second user requests temporary access, the authentication application 134 may check with the authentication server 104 whether the second user is authorized to access the workstation at all and, in some embodiments, whether his privilege level is sufficient to allow preempting of the first user's session. If so, the second user is, upon completion of authentication, given access to the shared desktop 134. To minimize delays upon such a user switch, the preempted user's applications 138 are not shut down, but merely selectively "hidden" on the desktop, i.e., sensitive applications (such as applications including or currently having access to PHI) are hidden from view and functionally disabled from accepting user input. For this purpose, the workstation may run an application-access-management module 140 as an intermediate layer between the operating system 130 and the application(s) 138. The application-access-management module 140 may determine which of the applications 138 started by the first user are sensitive and need to be hidden. For example, the module 140 may include or have access to a list of applications deemed sensitive. Alternatively, sensitivity may be determined for each application instance based on the data it currently accesses; for example, for a database application connected to a database on the central data server 106, the application-access-management module 140 may check whether the database contains sensitive information. In addition, even applications with sensitive information need not necessarily be hidden if the interrupting user is authorized to view such information, which may be determined, e.g., on a patient-by-patient basis. For instance, when a physician treating a particular patient requests access to a workstation 100 on which information about that patient is visible (e.g., because it is being used by a nurse working on that station 100), it is generally not necessary to hide that information from the physician's view; in fact, it may be desirable to allow the physician to readily access the information loaded by the nurse to avoid unnecessary, time-consuming workflow steps.

Following the determination which applications need to be hidden, the application-access-management module 140 causes the identified sensitive applications 138 to hide themselves, for example, by sending an operating instruction message to the message queue of each application requesting it to be hidden; such application hiding is a standard capability or utility offered by operating systems such as, e.g., WINDOWS, Linux, or Android. Hiding an application effectively takes the application from the visible desktop (such that the application is invisible on the computer's display), and thereby disables it from accepting input since the windowing paradigm dictates that only an application with active focus can accept user input (from a mouse, keyboard, etc.). Consequently, although the application is still running in the background, it is unable to use the desktop resources, which blocks it from being accessed by the new user. Since any application can instruct another application to hide or unhide itself, security is vulnerable to compromise as a new user could conceivably install an application to show the running applications of the workstation's prior user and issue an "unhide" instruction—thereby breaking the security bubble. To prevent this, the application-access-management module 140 may place a "hook" in the message queue(s) associated with the hidden application(s). The hook examines the contents of the message queue to intercept any "show window" messages (e.g., generated by the alt-tab application switcher) and, if the currently authenticated user is not the user who started the application instance targeted by the message, to dequeue and discard the message, thereby blocking the application window from becoming visible and active.

In the exemplary system depicted in FIG. 1, the desktop 134 and application 138 are installed and executed locally on the workstation 100, with access to information stored on a remote data server 106. However, implementations in which the desktop 134 and/or one or more of the application 138 are run remotely over the network, i.e., are executed on a central server (or group of servers) or in distributed manner on multiple network computers, are also within the scope of the present invention. Even if the desktop 134 is generated remotely, however, in accordance herewith, each desktop instance is dedicated to only one workstation 100 and shared among all users of that workstation 100—as distinguished from being dedicated to a particular user and following the user from workstation to workstation as is the case with virtualized desktops in prior-art terminal-emulation systems. Individual applications started via the desktop, on the other hand, are generally not shared among the desktop users, but when a new user preempts another user's session and the same application that the preempted user is running, a new instance of that application is started.

Figure 2:
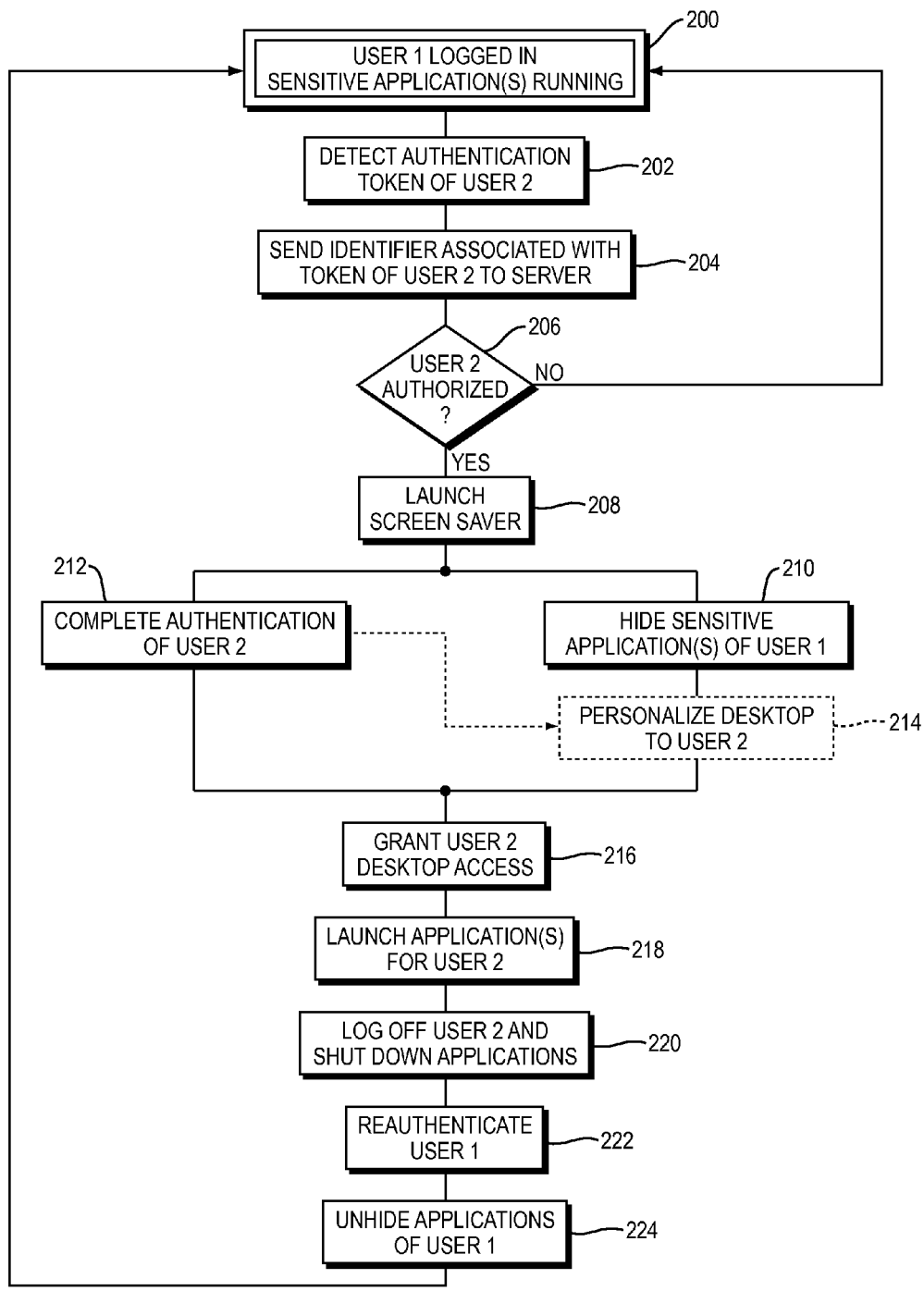
FIG. 2 is a flow chart illustrating methods for transitioning between workstation users in accordance with various embodiments.

FIG. 2 illustrates an exemplary workflow for transitioning user access at a shared workstation in accordance herewith. The starting point is a user logged in at the workstation and running at least one software application that contains or has access to sensitive information (200). The user's session may be interrupted when a second user requests temporary access to the workstation; for instance, a nurse's session may be preempted by a physician who needs immediate access. As illustrated, user transitioning may be streamlined by controlling access with authentication devices (e.g., device 122): when the workstation detects the presence of a new user, as inferred from the presence of an authentication token other than that of the first user (step 202), the workstation (e.g., its authentication module 134) automatically sends an identifier associated with the authentication token to the authentication server to check whether the new user is authorized to access the workstation (step 204). For example, with proximity readers, the doctor can simply present her facility access card to the reader associated with the workstation. The reader reads the card in a conventional manner (e.g., in accordance with ISO 7816), for example, by sending a radiofrequency (RF) signal that interacts with the card in accordance with a communication protocol to retrieve identifying information stored thereon. The workstation detects the card reader's activity and handles it as a priority interrupt, immediately forwarding the card identifier obtained by the reader to the authentication server. The server, in turn, validates the card's owner against a user database, determining the owner's identity and system privilege level. If that level is high enough, the server authorizes the workstation to allow the card owner to pre-empt the current workstation user and begin her own authenticated session (step 206).

Upon authorization of the second user, the workstation immediately covers the display with a screen saver (step 208), and begins hiding the sensitive (e.g., PHI-enabled) applications started by the first user (or instructs them to hide themselves) (step 210). As the applications are being hidden, the authentication procedure for the second user may be completed (step 212). For example, to ensure that the card presenter is in fact the owner of the card, the workstation may request a biometric indicium (e.g., a fingerprint) from the interrupting user; the indicium is compared against database records, either locally or at the authentication server, to verify a match. Alternatively, the authentication process may challenge the card presenter to enter another factor such as a PIN or password. On successful authentication, or in parallel with authentication completion based on the identifier associated with the second user's authentication token, the workstation may personalize the user's desktop (step 214) based, for example, on state information supplied to the workstation by the server. When authentication is complete, the screen saver is removed, and the second user is granted access to the (optionally personalized) desktop. (Without personalization, which is optional, the user is simply presented a generic desktop.) The interrupting user may then select the desired application(s), which may be launched locally with access to the facility's central data server (e.g., a PHI data store) (step 218). Alternatively, in some embodiments, individual users may select the application(s) to be launched upon interrupt; these selections may be stored in a database with the user's authentication credentials and passed to the local workstation upon successful user authentication. Still another approach is to analyze activity logs (e.g., generated by a single sign-on agent monitoring a user's accessing of the various applications) to determine the applications most often utilized by particular users, and a subset (e.g., the three most commonly used applications) of these can be launched when a particular user logs onto a workstation.

When the interrupting user no longer needs access to the workstation, she logs off (e.g., by pressing a "log off" button on the screen) to cede control to the original user (step 220); log-off causes the applications opened by the second user to shut down. In some embodiments, the interrupting user terminates her workstation session by again presenting her access card (or other authentication token) to the reader. The workstation detects the card reader's activity and handles it as a priority interrupt, bringing up the screen saver as the interrupting user's applications are closed and shut down. The desktop containing the first user's applications can then be immediately displayed by "unhiding" her (still running) applications (step 224), or delayed pending re-authentication (step 222) by the first user. For example, the original user may be asked to enter her credentials into a log-in window of the screen saver or present her own access card (or other authentication token) to the reader. Accordingly, this approach supports temporary disruption of access by allowing priority users to pre-empt another user on the computer and launch a specific application (and sign on to it automatically) while preserving the state of the applications started by the pre-empted user.

As will be readily understood by one of skill in the art, the various authentication and communication routines described above may be implemented, on the server(s) and workstation(s), by computer-executable instructions (including, e.g., routines, programs, objects, components, data structures, etc. that perform particular tasks or implement particular data types) programmed in any suitable programming language, including, without limitation assembly language, Ada, APL, Basic, C, C++, C*, COBOL, dBase, Forth, FORTRAN, Java, Modula-2, Pascal, Prolog, Python, REXX, and/or JavaScript. It is not necessary that a single type of instruction or programming language be utilized in conjunction with the operation of the system and method of the invention; rather, any number of different programming languages may be utilized as is necessary or desirable.

Further, those skilled in the art will appreciate that the processing units that execute the commands and instructions may be general-purpose processors, but may alternatively utilize any of a wide variety of other technologies including special-purpose hardware, a microcomputer, mini-computer, mainframe computer, programmed microprocessor, microcontroller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), RFID processor, smart chip, or any other device or arrangement of devices that is capable of implementing the steps of the processes of the invention.

Also, the server(s) may be implemented using any number of various computer system configurations, including multi-processor systems, microprocessor-based or programmable consumer electronics, minicomputers, mainframe computers, and the like. The server may also be realized in distributed computing environments where tasks are performed by remote processing nodes linked through a communication network. In a distributed computing environment, program modules may be located in both local and remote computer-storage media including memory storage devices.

In some embodiments, the server(s) and workstation(s) each comprise or consist of a general-purpose computing device in the form of a computer including a processing unit, a system memory, an interface for wireless and/or wired network communications, optionally an interface facilitating wireless cell phone communications via telecommunication carriers, and a system bus that couples various system components including the system memory to the processing unit. Computers typically include a variety of computer-readable media that can form part of the system memory and be read by the processing unit. The system memory may include volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The server(s) and workstation(s) may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Although the invention has been described herein with respect to specific embodiments and details, various modifications, alternative embodiments, and different combinations of features that still solve the problems addressed by the invention in a similar manner will be readily apparent to a person of skill in the art, and are understood to be within the scope of the invention. For example, while user transitions at a workstation are herein described in the context of a network environment with a central authentication server, various key features of the invention (such as hiding applications without shutting them down) can straightforwardly applied to individual computers shared among multiple users. Further, user authentication for access control can generally be achieved in any manner, and need not necessarily be accomplished with authentication tokens and associated readers as described herein. Also, while the shared user interface from which individual applications are launched is herein referred to as the "desktop," any user interface that provides an access portal to different applications and functions similarly to a conventional desktop GUI in respects relevant to transitioning between users in accordance herewith may be used. Thus, the embodiments described herein are merely illustrative and not restrictive.

What is claimed is:

1. A workstation configured for transitioning access to a shared desktop, the workstation comprising:
   a user-authentication device for electronically detecting and obtaining data from an authentication token;
   a network interface;
   at least one user interface device; and
   a computer processor in electronic communication with the user-authentication device and the at least one user interface device and which:
   (i) runs at least one application launched at a request of a first user and visible on the at least one user interface device;
   (ii) determines that at least one application launched by the first user is sensitive based on data accessed thereby;
   (iii) recognizes a signal from the user-authentication device indicative of a use request by a second user, the use request including an identifier associated with the second user;
   (iv) transmits, via the network interface, the identifier associated with the second user to a server;
   (v) receives, via the network interface, an authorization from the server for the second user to access the shared desktop on the workstation;
   (vi) launches a screen saver before allowing the second user to log on;
   (vii) hides on the at least one user interface device, without shutting down and while the screen saver is active, the at least one sensitive application launched by the first user;
   (viii) allows the second user to log on to the workstation via the at least one user interface device and the network interface to thereby access the shared desktop;
   (ix) launches at least one application requested by the second user;
   (x) allows the second user to log off the workstation via the at least one user interface device and the network interface, and following log-off of the second user,
   (xi) unhides the at least one sensitive application launched at the request of the first user.

2. The workstation of claim 1, wherein the computer processor selectively hides only applications that have access to secure data and which the second user is not authorized to view.

3. The workstation of claim 1, wherein the computer processor requires a secondary form of authentication from the second user prior to allowing the second user to log on to the workstation.

4. The workstation of claim 1, wherein the computer processor automatically launches, following log-on of the second user, at least one application.

5. The workstation of claim 4, wherein the at least one automatically launched application is specified by a database record of the second user accessed by the server.

6. The workstation of claim 4, wherein the at least one automatically launched application is determined at least in part based on activity logs of the second user.

7. The workstation of claim 1, wherein the computer processor prevents the second user from unhiding the at least one application launched at the request of the first user.

* * * * *